United States Patent [19]
Van Kleeck

[11] Patent Number: 6,041,137
[45] Date of Patent: Mar. 21, 2000

[54] RADICAL DEFINITION AND DICTIONARY CREATION FOR A HANDWRITING RECOGNITION SYSTEM

[75] Inventor: Michael Van Kleeck, Seattle, Wash.

[73] Assignee: Microsoft Corporation, Redmond, Wash.

[21] Appl. No.: 08/519,425

[22] Filed: Aug. 25, 1995

[51] Int. Cl.[7] .................................................. G06K 9/72
[52] U.S. Cl. ......................... 382/185; 382/187; 382/229
[58] Field of Search .................................. 382/185, 160, 382/161, 229–231, 186–189, 203, 204, 219, 190, 225; 395/751, 760, 752–759; 707/535

[56] References Cited

U.S. PATENT DOCUMENTS

| | | | |
|---|---|---|---|
| 3,979,722 | 9/1976 | Sakoe ....................................... | 340/215 |
| 4,365,235 | 12/1982 | Greanias et al. ......................... | 340/189 |
| 4,410,916 | 10/1983 | Pratt et al. ............................... | 358/433 |
| 4,542,526 | 9/1985 | Satoh et al. .............................. | 382/187 |
| 4,559,615 | 12/1985 | Goo et al. ................................ | 707/535 |
| 4,573,196 | 2/1986 | Crane et al. ............................. | 382/185 |
| 4,628,532 | 12/1986 | Stone et al. .............................. | 382/197 |
| 4,630,309 | 12/1986 | Karow ..................................... | 382/241 |

(List continued on next page.)

OTHER PUBLICATIONS

Sien et al. "Radical Extraction Methods for Processing and Recognition of Chinese Characters." International Symposium on Computer Architecture and Digital Signal Processing, vol. 1, pp. 480–483, Oct. 1989.

Suen et al. "Analysis and Recognition of Alphanumeric Handprints by Parts." Proceedings 11th International Conference on Pattern Recognition, vol. II, pp. 338–341, Sep. 1992.

Lee et al. "A Fuzzy Rule–Based System for Structure Decomposition on Handwritten Chinese Characters." Proceedings of IEEE International Conference on Systems, Man and Cybernetics, vol. 1, pp. 487–492, Oct. 1994.

Cheng and Hsu, "Partial pattern extraction and matching algorithm for Chinese characters.", Proc. of the IASTED Internat. Symp. on Robotics and Automation, Acta Press, pp. 18–22, May 1985.

Wang, A.–B.; Huang, J.S. ; Fan, J.–C., Optical recognition of handwritten Chinese characters by partial matching, IEEE Compuy. Soc. Press, pp. 822–825, Oct. 1993.

(List continued on next page.)

*Primary Examiner*—Jon Chang
*Attorney, Agent, or Firm*—Michalik & Wylie, PLLC

[57] ABSTRACT

The system described herein automatically defines a set of radicals to be used in a Kanji character handwriting recognition system and automatically creates a dictionary of the Kanji characters that are recognized by the system. In performing its functionality, the system described herein first obtains representative handwriting samples for each Kanji character that is to be recognized by the system. The system described herein then evaluates the samples to identify a set of subparts ("radicals") that are common to at least two of the Kanji characters. These radicals represent component roots from which the characters are formed. Each Kanji character is formed by one or more of these radicals. The radicals that are identified by the system described herein are not constrained to any preset definition (e.g., the traditional set of radicals used to organize Japanese dictionaries). Thus, the radicals utilized by the system described herein may include some of the traditional radicals or may include none of the traditional radicals. After identifying the set of radicals, the system described herein generates a dictionary with a mapping of each Kanji character that is to be recognized by the system to its component radicals. After the set of radicals and the dictionary have been created, these components can be utilized during handwriting recognition. When performing handwriting recognition, the system described herein identifies the radicals within the handwriting and then uses the mapping to determine which Kanji character the handwriting most closely matches.

24 Claims, 8 Drawing Sheets

U.S. PATENT DOCUMENTS

| | | | |
|---|---|---|---|
| 4,653,107 | 3/1987 | Shojima et al. | 382/189 |
| 4,672,677 | 6/1987 | Yamakawa | 382/185 |
| 4,680,804 | 7/1987 | Kuzunuki et al. | 382/185 |
| 4,680,805 | 7/1987 | Scott | 382/197 |
| 4,685,142 | 8/1987 | Ooi et al. | 382/185 |
| 4,701,960 | 10/1987 | Scott | 382/122 |
| 4,718,103 | 1/1988 | Shojima et al. | 382/189 |
| 4,972,496 | 11/1990 | Sklarew | 382/187 |
| 4,979,226 | 12/1990 | Sato | 382/197 |
| 5,007,098 | 4/1991 | Kumagai | 382/185 |
| 5,010,579 | 4/1991 | Yoshida et al. | 382/187 |
| 5,113,452 | 5/1992 | Chatani et al. | 382/187 |
| 5,119,296 | 6/1992 | Zheng et al. | 395/797 |
| 5,121,441 | 6/1992 | Chefalas et al. | 382/189 |
| 5,121,442 | 6/1992 | Togawa et al. | 382/189 |
| 5,151,950 | 9/1992 | Hullender | 382/187 |
| 5,191,622 | 3/1993 | Shojima et al. | 382/185 |
| 5,265,174 | 11/1993 | Nakatsuka | 382/189 |
| 5,303,313 | 4/1994 | Mark et al. | 382/235 |
| 5,325,444 | 6/1994 | Cass et al. | 382/177 |
| 5,481,472 | 1/1996 | Chung et al. | 364/491 |
| 5,586,198 | 12/1996 | Lakritz | 382/185 |

OTHER PUBLICATIONS

Tappert, Charles C. et al., "The State of the Art in On–Line Handwriting Recognition," *IEEE Trans. on Pattern Analysis and Machine Intelligence* 12(8):787–808, 1990.

KoJain, Anil, *Algorithms for Clustering Data*, Chap. 3, "Clustering Methods and Algorithms," 1988, pp. 55–142.

Gonzalez, Rafael C. and Richard E. Woods, *Digital Image Processing*, Addison Wesley, 1992, pp. 580–581.

Fukunaga, Keinosuke, *Introduction to Statistical Pattern Recognition*, 2d ed., Academic Press, Inc., Boston, Mass., pp. 508–563.

Duda, Richard O. and Peter E. Hart, *Pattern Classification and Scene Analysis*, John Wiley & Sons, New York, Chap. 6 and 7, pp. 189–260 and 263–297.

Ikeda, Katsuo et al., "On–Line Recognition of Hand–Written Character Utilizing Positional and Stroke Vector Sequences," in *Proceedings of Fourth International Joint Conference on Pattern Recognition*, International Association for Pattern Recognition, Kyoto, Japan, Nov. 7–10, 1978, pp. 813–815.

RADICAL DEFINITION AND DICTIONARY CREATION FOR A HANDWRITING RECOGNITION SYSTEM

TECHNICAL FIELD

The present invention relates generally to data processing systems and, more particularly, to radical definition and dictionary creation in a handwriting recognition system.

BACKGROUND OF THE INVENTION

Kanji is a Japanese system of writing that utilizes characters borrowed or adapted from Chinese writing. The elements of grammar in Kanji are known as "Kanji characters." The phrase "elements of grammar" refers to units of a given natural language that are capable of comprising parts of speech. For example, the elements of grammar in the English language are words. As such, each Kanji character is a higher order linguistic symbol that is analogous to a word in the English language. That is, natural languages tend to have three levels of linguistic elements. The lowest of these levels depends on the specific alphabet used and is associated with the sounds of the spoken language. For example, the first and lowest level of linguistic elements in the English language comprises letters. The third level of linguistic elements is the highest level and contains linguistic elements conveying full creative expression. In the English language, the third level comprises sentences. It is the second level of linguistic elements to which the phrase "elements of grammar" refers. This second level is an intermediate level of linguistic elements and in the English language, the second level comprises words. In Japanese, the second level comprises Kanji characters.

Kanji characters typically comprise radicals. A "radical" is a part of a Kanji character, much like letters are part of a word. Oftentimes, a radical is itself a Kanji character. For example, FIG. 1 depicts a Kanji character 100 that comprises two radicals 102 and 104. Radical 102 is the "day" radical and radical 104 is the "month" radical. When combined, the resulting Kanji character 100 means "open." There is a well-known, standard set of 214 radicals that are referred to as "traditional radicals." FIGS. 2A and 2B depict the set of traditional radicals 200. Within the set of traditional radicals 200, each radical is enumerated from 1–214 with alternative drawings indicated with either parenthesis or brackets (e.g., "(32)").

Some conventional computer systems for recognizing Kanji handwriting have focused on recognizing traditional radicals in order to recognize a Kanji character. This technique is known as "radical recognition." These conventional systems have attained higher accuracy in recognizing Kanji characters over previous systems, and have reduced the amount of data that must be stored when performing Kanji character recognition. However, the conventional radical recognition approach suffers from a few drawbacks. First, it is difficult to determine which radicals of the traditional radicals should be used. Some of the traditional radicals are individual ("atomic") radicals and others are combinations of atomic radicals. Hence, a decision must be made whether to use the atomic radicals, the combination radicals, or both. A second drawback is that after the set of radicals is determined, each radical typically must be manually entered into a database and mapped onto the Kanji characters that utilize the radicals. This procedure is time consuming. The third drawback stems from the conventional approach being nonextensible. That is, the conventional approach cannot be used with non Kanji-based languages. Also, after the radicals are mapped onto the Kanji characters, if the system is to be extended to recognize new Kanji characters, the set of radicals and the set of Kanji characters that are recognized usually have to be augmented manually, which is a time consuming task. That is, the additional Kanji characters have to be entered manually into the system and associated with their component radicals. Augmenting the set of Kanji characters that are recognized is a likely possibility since there are over 500,000 Kanji characters and most Kanji handwriting recognition systems only recognize a few thousand. Based upon these drawbacks, it is desirable to improve conventional radical recognition systems.

SUMMARY OF THE INVENTION

The system described herein automatically defines a set of radicals to be used in a Kanji character handwriting recognition system and automatically creates a dictionary of the Kanji characters that are recognized by the system. As a result, the system described herein facilitates the development of Kanji handwriting recognition systems and attains a higher accuracy over conventional systems when recognizing Kanji handwriting. Additionally, the system described herein is fully extensible and can therefore be extended with little effort to recognize different languages. Moreover, if the system described herein is used for Kanji character recognition, it can be extended easily to recognize additional radicals and Kanji characters. In performing its functionality, the system described herein first obtains representative handwriting samples for each Kanji character that is to be recognized by the system. The system described herein then evaluates the samples to identify a set of subparts ("radicals") that are common to at least two of the Kanji characters. These radicals represent component roots ("visual components") from which the characters are formed. Each Kanji character is formed by one or more of these radicals. The radicals that are identified by the system described herein are not constrained to any preset definition (e.g., the traditional set of radicals). Thus, the radicals utilized by the system described herein may include some of the traditional radicals or may include none of the traditional radicals. After identifying the set of radicals, the system described herein generates a dictionary with a mapping of each Kanji character that is to be recognized by the system to its component radicals. After the set of radicals and the dictionary have been created, these components can be utilized during handwriting recognition. When performing handwriting recognition, the system described herein identifies the radicals within the handwriting and then uses the mapping to determine which Kanji character the handwriting most closely matches.

In accordance with a first aspect of the present invention, a method for generating radicals of Kanji characters is practiced in a computer system. This method provides for receiving sample handwriting data from at least one user comprising a plurality of Kanji characters with each Kanji character comprising at least one radical that is a common component of at least two Kanji characters. Further, the method provides for examining the sample handwriting data to automatically create a set of radicals from the sample handwriting data.

In accordance with a second aspect of the present invention, a computer system for recognizing Kanji characters is provided. In accordance with the second aspect of the present invention, the computer comprises an analyzer component for receiving sample handwritten data comprising a plurality of Kanji characters and for automatically defining a set of radicals from the sample handwriting data and a recognizer component for receiving handwriting user input indicating an intended Kanji character and for comparing the received handwriting user input to the set of radicals to determine the intended Kanji character.

BRIEF DESCRIPTION OF THE DRAWINGS

FIGS. 2A and 2B depict the set of traditional radicals.

DETAILED DESCRIPTION OF THE INVENTION

Figure 1:
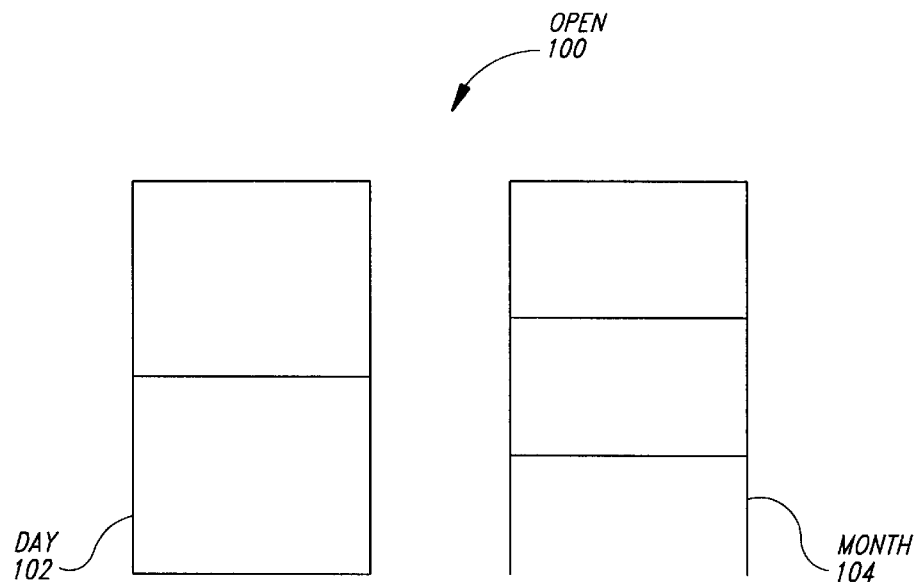
FIG. 1 depicts the "open" Kanji character.

A preferred embodiment of the present invention automatically defines a set of radicals to be used in a Kanji character handwriting recognition system and automatically creates a dictionary of the Kanji characters that are recognized by the system. As a result, the preferred embodiment of the present invention facilitates the development of Kanji handwriting recognition systems and attains a higher accuracy over conventional systems when recognizing Kanji handwriting. Additionally, the preferred embodiment of the present invention is fully extensible. Thus, the preferred embodiment, with little effort, can recognize additional radicals or Kanji characters and can be extended to recognize other languages that are either Kanji-based or non Kanji-based. For example, the techniques as described below can be used for recognizing words within the English language.

In performing its functionality, the preferred embodiment first obtains representative handwriting samples for each Kanji character that is to be recognized by the system. The preferred embodiment then evaluates the samples to identify a set of subparts ("radicals") that are common to at least two of the Kanji characters. These radicals represent component roots from which the characters are formed. Each Kanji character is formed by one or more of these radicals. The radicals that are identified by the preferred embodiment are not constrained to any preset definition (e.g., the traditional set of radicals). Thus, the radicals utilized by the preferred embodiment may include some of the traditional radicals or may include none of the traditional radicals. After identifying the set of radicals, the preferred embodiment generates a dictionary with a mapping of each Kanji character that is to be recognized by the system to its component radicals. After the set of radicals and the dictionary have been created, these components can be utilized during handwriting recognition. When performing handwriting recognition, the preferred embodiment identifies the radicals within the handwriting and then uses the mapping to determine which Kanji character the handwriting most closely matches.

As previously stated, the preferred embodiment automatically defines radicals and creates a mapping between the radicals and the Kanji characters that are to be recognized by the system. The radicals are defined and the dictionary is created by running an automated process on the Kanji handwriting samples. This automated process is embodied in the analyzer of the preferred embodiment. The analyzer receives, from a number of users, samples of the Kanji characters that are to be recognized by the system. The analyzer then sorts the samples for a given character by the number of strokes comprising the sample. For all samples having the same number of strokes for a given character, the analyzer categorizes the samples according to the shape and direction of their component strokes (e.g., vertical, horizontal, clockwise, etc.). After categorizing the samples, all samples within the same category are averaged together to render an averaged sample for each category. The analyzer then evaluates all averaged samples, across all character and stroke categories, to determine whether any groups of four consecutive strokes are similar among the averaged samples. Each group that is similar identifies a radical with four strokes. The analyzer performs a similar evaluation on groups of three consecutive strokes and groups of two consecutive strokes to identify additional radicals. The similar groups of strokes are averaged together to form radicals that are subsequently used during the handwriting recognition process. After creating the radicals, the analyzer creates the Kanji character dictionary. The Kanji character dictionary contains the Kanji characters to be recognized by the system and a mapping from each Kanji character onto its previously defined component radicals.

After the analyzer defines the radicals and creates the Kanji dictionary, another automated process is utilized to recognize Kanji handwriting as input by a user. This automated process is embodied in the recognizer of the preferred embodiment. In performing its processing, the recognizer first receives handwriting input data from a user identifying an intended Kanji character. After receiving the handwriting input data, the recognizer divides the handwriting input data into its component strokes. The recognizer then forms various groups of the component strokes and compares these groups to the radicals previously defined by the analyzer. If a group compares favorably to a radical, a match occurs. After finding matching radicals, the recognizer combines the matches into a Kanji character and compares this character to the Kanji dictionary to determine if the character is valid. In this manner, the recognizer determines which character within the Kanji character dictionary was most likely intended by the user. By utilizing both the analyzer and the recognizer Kanji handwriting recognition is facilitated and improved recognition results are achieved.

Figure 3:
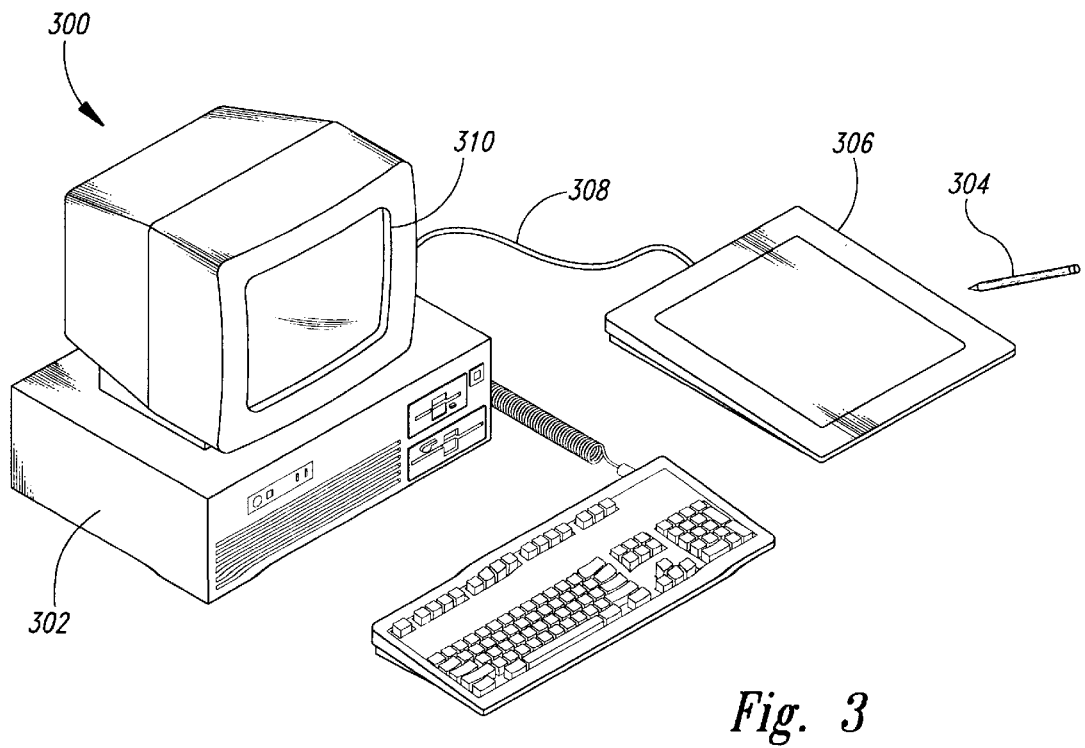
FIG. 3 depicts a computer system suitable for practicing a preferred embodiment of the present invention.

FIG. 3 depicts a computer system 300 that is suitable for practicing the preferred embodiment of the present invention. The computer system 300 comprises a computer 302, a pen 304, a digitizing tablet 306, a connecting cable 308 and a screen display 310. The tablet 306 detects contact of the pen 304 with the tablet. The tablet 306 is divided into a grid of discrete points, with each point having associated coordinates. When the tablet 306 detects contact by the pen 304, the tablet sends the coordinates of the contact point to the computer 302 through the connecting cable 308. Upon receiving the coordinates, the computer 302 "inks" the contact point; that is, the computer sends data to the tablet 306 to distinguish a pixel on the tablet that corresponds to the contact point. In addition, the computer 302 "inks" the contact point that corresponds to the screen display 310 of the computer. To a user, the inking of the contact point appears as if the pen writes the point onto the tablet 306 where the pen 304 made contact, as well as the corresponding point on the screen display 310.

Figure 4:
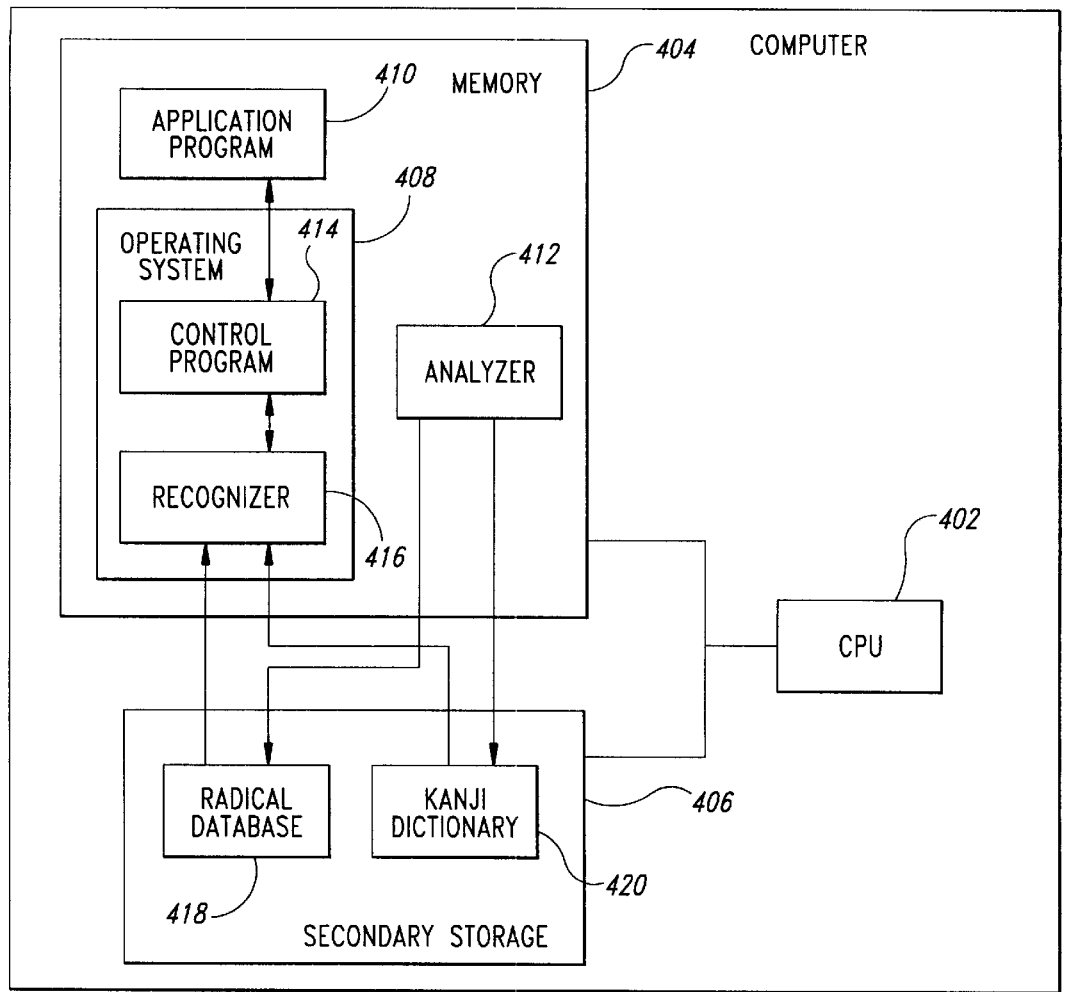
FIG. 4 depicts a more detailed block diagram of the computer of FIG. 3.

FIG. 4 depicts a more detailed block diagram of computer 203. The computer 302 comprises a central processing unit (CPU) 402, a memory 404 and a secondary storage device 406. The memory 404 includes an operating system 408, an application program 410 and an analyzer 412. The operating system 408 is responsible for managing system resources and contains a control program 414 and a recognizer program 416. The secondary storage device 406 contains a radical database 418 and a Kanji dictionary 420.

As will be further described below, the analyzer 412 receives sample handwriting data from a number of users and from this sample data, the analyzer creates both the radical database 418 and the Kanji dictionary 420. The analyzer 412 performs this processing off-line. That is, the processing of the analyzer 412 is performed before a user can use the computer 302 to perform normal processing (i.e., recognize handwritten data). The analyzer 412 receives the sample data containing handwritten Kanji characters and scans the sample data for common subparts. These common subparts are not constrained to the traditional set of radicals and thus may include some radicals that are contained within the traditional set of radicals, as well as radicals that are not contained within the traditional set of radicals. The analyzer 412 stores these common subparts as radicals into the radical database 418 for use during handwriting recognition ("the recognition process"). In addition, the analyzer 412 stores the Kanji characters with a reference to the radicals that comprise each Kanji character into the Kanji dictionary 420. The Kanji dictionary 420 is also used during the recognition process.

During the recognition process, the control program 414 receives an indication when the user touches the pen to the tablet. Upon receiving this indication, the control program 414 inks the screen display of the computer system and gathers the handwritten input data. After gathering the handwritten input data, the control program 414 sends the handwritten input data to the recognizer 416. When the user has completed the handwritten input data, the control program 414 invokes the recognizer 416 to convert the handwritten data into displayable text (e.g., Kanji characters). During conversion, the recognizer 416 compares portions of the handwritten input data to the radicals stored in the radical database 418. Upon finding a match, the recognizer utilizes the Kanji dictionary 420 to map the radicals onto a Kanji character. After mapping the radicals onto a Kanji character, the recognizer 416 passes a character code indicating the Kanji character to the control program 414 and the control program, in turn, sends the character code to the application program 410 to display the indicated Kanji character to a user. An example of the application program 410 is a word processor.

Figure 5:
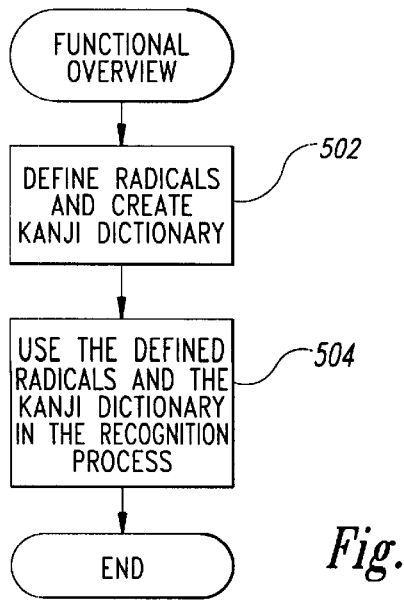
FIG. 5 depicts a functional flowchart of the preferred embodiment of the present invention.

As previously stated, the functionality of the preferred embodiment of the present invention is provided in two parts, as illustrated in FIG. 5. In order to use the preferred embodiment of the present invention, the analyzer is first invoked tog define a set of radicals and to create the Kanji dictionary (step 502). After creating the set of radicals and the Kanji dictionary, these components are then used by the recognizer during the recognition process (step 504).

Figure 6A:
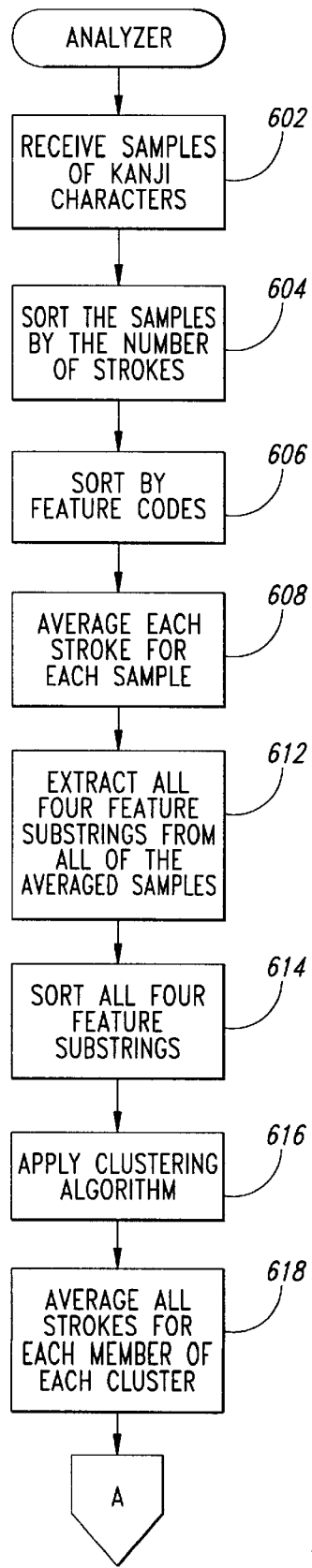
FIGS. 6A and 6B depict a flowchart of the analyzer of the preferred embodiment of the present invention.
Figure 6B:
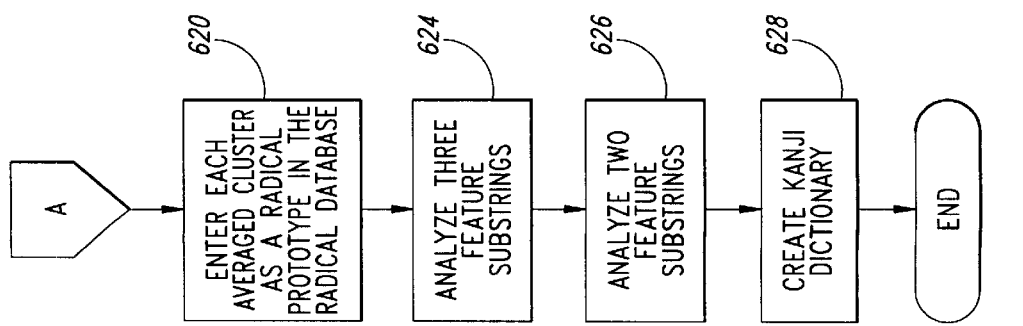

FIGS. 6A and 6B depict a flowchart of the steps performed by the analyzer of the preferred embodiment of the present invention. The analyzer is responsible for creating both the radical database as well as the Kanji dictionary. The first step performed by the analyzer is to receive samples of the Kanji characters that are to be recognized by the system (step 602). In this step, the analyzer receives handwritten samples via the tablet of all of the Kanji characters that are to be recognized by the system. However, as will be apparent to one skilled in the art, the samples could be words in the English language or another language and, thus, the preferred embodiment would operate in that language. The preferred embodiment recognizes 3,000 Kanji characters and, thus, samples for all 3,000 Kanji characters are obtained in this step. Since the accuracy of the system increases with the number of people who provide samples, it is desirable to obtain samples from as many people as possible. The preferred embodiment obtains samples from 100 people. The samples are received by the system in such a manner that the samples are already associated with a particular Kanji character. For example, each of the 3,000 Kanji characters are displayed one at a time on the screen display, and the user enters a handwriting sample of the displayed character via the tablet.

Figure 7A:
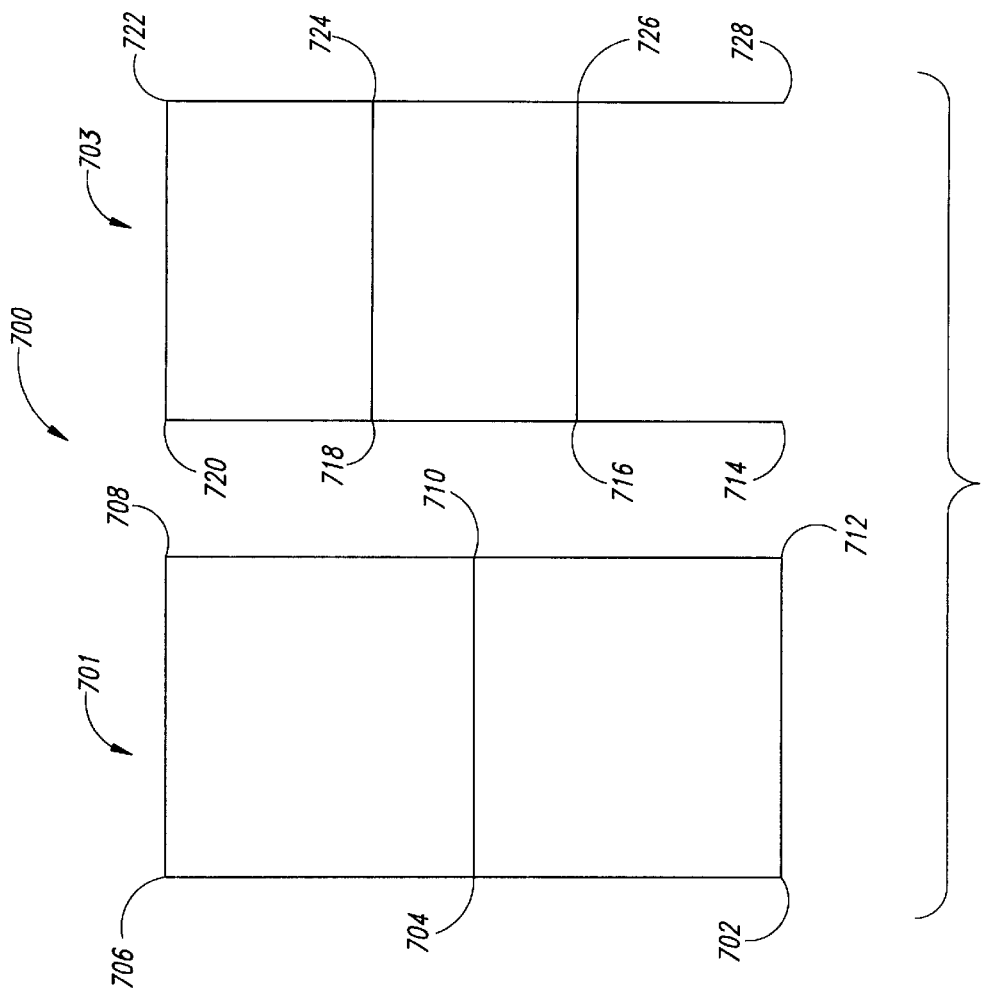
FIG. 7A depicts the "open" Kanji character with each of its vertices marked with a reference numeral.

After receiving the samples of the Kanji characters, for each Kanji character, the analyzer sorts the samples by the number of strokes the user used to draw that Kanji character (step 604). A "stroke" refers to the ink that is displayed during the time when the user has touched the pen to the tablet to the time when the user picks the pen up from the tablet. When the user enters a sample, the system keeps track of the number of strokes, as well as each stroke's position relative to the tablet. Thus, the recognizer has access to the number of strokes for each sample. The position of each stroke is expressed through the use of X and Y Cartesian coordinates that identify the end points of each stroke. The number of strokes used for drawing a Kanji character is not constant and may vary among users. For example, the "day" radical can be written using a varying number of strokes, as shown in FIG. 7A. FIG. 7A depicts the "open" Kanji character 700 with each of its vertices labeled with a reference numeral. The "open" Kanji character 700 comprises the "day" radical 701 and the "month" radical 703. To illustrate that a Kanji character, or radical, can be written using a varying number of strokes, consider the following example. One user may choose to draw the "day" radical 701 using three strokes. In making the first stroke, the user touches the pen to the tablet at point 706 and draws a stroke between point 706 through point 704 and ending at point 702. The second stroke starts at point 706, extends to point 708, down to point 710, further down to point 712 and ends at point 702. The third stroke extends between the points 704 and 710. Alternatively, a user may draw the "day" radical 701 using four strokes. In this case, the user touches the pen to the tablet at point 706, extends the stroke through point 704 and ends the stroke at point 702. The second stroke starts at point 706, extends through points 708 and 710 and ends at point 712. The third stroke extends between points 704 and 710, and the fourth stroke extends between points 702 and 712, thereby completing the "day" radical 701. Similarly, the "month" radical 703 can be written using a varying number of strokes.

Figure 7B:
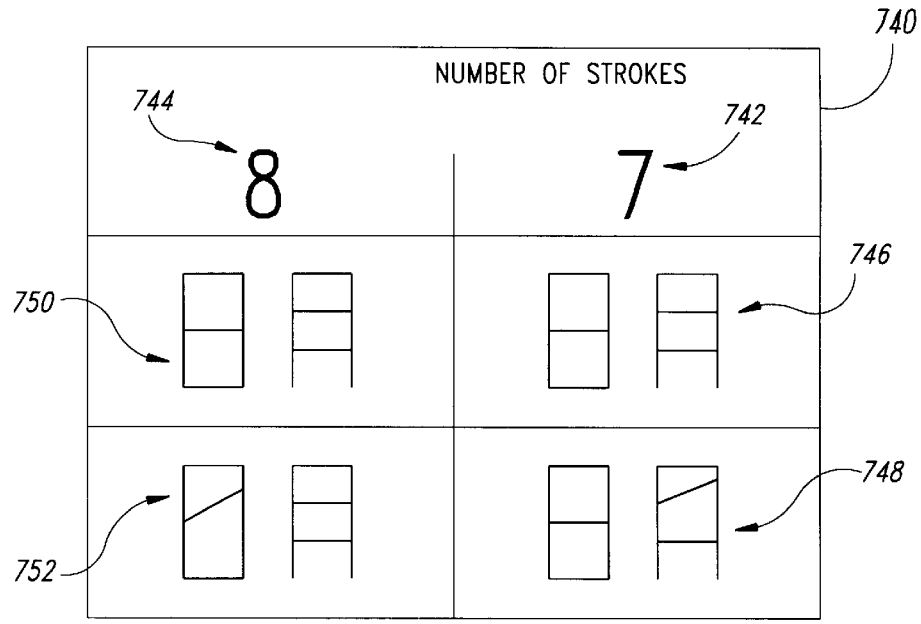
FIG. 7B depicts a table for storing samples of a handwritten Kanji character where the samples are sorted by the number of strokes comprising each sample and the feature codes of each sample.

FIG. 7B depicts a table 740 illustrating a sorting of the samples according to the number of strokes. The table 740 contains two columns 742 and 744 that contain samples having seven strokes and eight strokes, respectively. For example, with reference to FIG. 7A, the "open" Kanji character 700 may comprise seven strokes by the user drawing the "day" radical 701 with three strokes, as described above, and the user drawing the "month" radical 703 with four strokes. In drawing the "month" radical 703 with four strokes, the user draws the first stroke starting at point 720, extending through points 718 and 716 and ending at point 714. The second stroke is drawn starting at point 720, extending through points 722, 724, and 726 and ending at point 728. The third stroke starts at point 718 and ends at point 724 and the fourth stroke starts at point 716 and ends at point 726. The "open" Kanji character 700 may comprise eight strokes by the user drawing the "day" radical 701 with four strokes, as described above, and drawing the "month" radical 703 with four strokes, also as described above. It should be noted that table 740 is used for illustrative purposes only and the "open" Kanji character can comprise additional numbers of strokes. Within each column (e.g., 742) the samples having the indicated number of strokes are stored (e.g., 746 and 748).

Figure 7C:
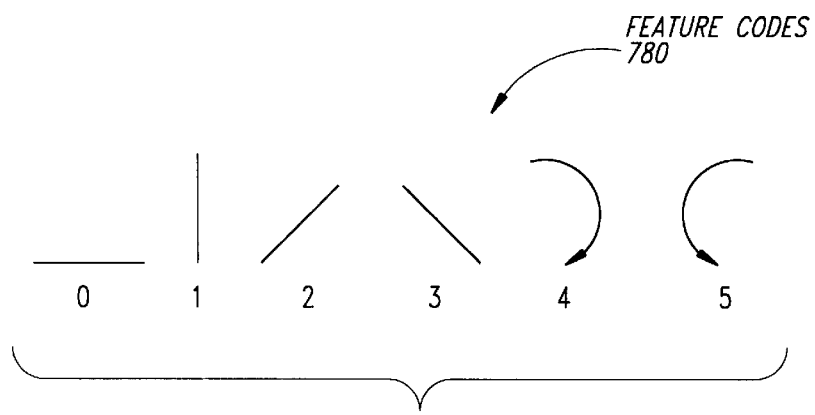
FIG. 7C depicts the feature codes utilized by the preferred embodiment of the present invention.

After sorting the samples by the number of strokes, each of the samples for a given number of strokes is sorted according to its feature codes (step 606). In this step, the preferred embodiment analyzes each stroke of a sample in the order in which the stroke was drawn and compares the stroke to prestored shapes that are associated with numbers. Once a match to a prestored shape occurs, the number associated with the prestored shape is then associated with the stroke as a feature code. Thus, there is one feature code for each stroke for a given sample. The feature codes for all of the strokes for a sample are referred to as the feature codes of the sample. FIG. 7C depicts the feature codes 780 that are used by the preferred embodiment. The preferred embodiment analyzes a stroke to determine whether the stroke matches any of the features depicted in FIG. 7C, such as a horizontal line that is assigned the feature code of "0," a vertical line assigned the feature code of "1," an angular line extending from the lower left to the upper right assigned the feature code of "2," an angular line extending from the upper left to the lower right assigned the feature code of "3," or a directional stroke. The directional strokes include a clockwise directional stroke that is assigned the feature code of "4" starting from the upper left extending to the right and downward, and a counter-clockwise directional stroke that is assigned the feature code of "5" starting at the upper right extending to the left and downwards.

To better illustrate the use of feature codes, consider the following example using the sample "open" Kanji character 750. As indicated in Table 740, the sample Kanji character 750 comprises eight strokes. As described above, the first four strokes are used to draw the "day" radical and the remaining four strokes are used to draw the "month" radical. Given the order of the strokes as drawn by a user, when determining the feature codes, each stroke is compared against the feature codes 780 in turn. Thus, the first stroke extending from point 702 to 706 matches the vertical line indicated as feature code "1." The second stroke extending from points 706 through points 708 and 710 and ending at point 712 matches the clockwise directional stroke indicated as feature code "4." The third stroke extending from points 704 to 710 and the fourth stroke extending from points 702 to 712 match the "0" feature code. With respect to the "month" radical, the fifth stroke extending from point 714 to point 720 matches the "1" feature code. The stroke extending from point 720 through points 722, 724, 726 and ending at point 728, matches the "4" feature code. The seventh and eighth strokes extending from points 718 to 724 and 716 to 726, respectively, both match the "0" feature code. Therefore, the feature code for the entire eight-stroke, sample Kanji character 750 is equivalent to "14001400."

It should be appreciated that feature codes can vary between samples having the same number of strokes due to stylistic differences of the users. As can be seen from the Table 740, sample 752 is dissimilar in shape to that of sample 750 due to the third stroke extending in an angular direction from the lower left to the upper right. As such, sample Kanji character 752 has a feature code of "14201400." Therefore, when a user stylistically has a slightly different version of the same character, the feature codes for that character may change. With reference to step 606, the analyzer determines the feature codes for each sample of a character having the same number of strokes and sorts each variation according to its feature codes. Since sample 752 has feature codes of 14201400, which is numerically larger than the feature codes of sample 750 (i.e., 14001400), no reordering of the samples in column 744 is necessary. The result of this step is a table similar to that depicted in FIG. 7B. The use of feature codes and, more generally, Kanji handwriting recognition is more clearly described in U.S. patent application Ser. No. 08/452,660, entitled "Handwritten Symbol Recognizer," which is hereby incorporated by reference. Although the preferred embodiment utilizes the feature codes depicted in FIG. 7C, one skilled in the art will appreciate that different feature code systems can be used. Such different feature code systems may include the thirteen member feature code system described in U.S. patent application Ser. No. 08/452,660, entitled "Handwritten Symbol Recognizer."

At this point in the processing of the analyzer, the samples of Kanji characters in the sample data have been sorted by their associated Kanji character and the samples for each character, in turn, have been sorted by the number of strokes comprising the character. Additionally, for each grouping of samples having the same number of strokes, the samples have also been sorted by their feature codes. It should be appreciated that there may be more than one sample having the same feature codes and the same number of strokes for the same Kanji character. The next step that the analyzer performs is to average each stroke for each sample of a Kanji character having the same feature codes and the same number of strokes (step 608). When the samples are received by the analyzer, the analyzer also receives the X and Y coordinates of the end points for each stroke within the sample. In this step, the corresponding stroke for each sample is averaged together by averaging their X and Y coordinates with the result being an "averaged sample." All of the averaged samples are stored for further processing.

After averaging the samples, the analyzer extracts all four-feature code substrings from the averaged sample (step 612). For example, the sample 750 has the feature code "14001400." Therefore, the four-feature code substrings include 1400, 4001, 0014, 0140, and 1400. These four-feature code substrings reflect groups of four consecutive strokes within the sample that will be used for comparison against groups of four consecutive strokes within other samples to determine if they match. Such a match may be a strong indication that the matching groups of strokes is a common occurrence among the samples and should be evaluated further to determine whether they should be designated as a radical. As a more extensive example, assume that the averaged samples for various Kanji characters includes the following:

古 明 昌 肚 早 吐 古 圧 占 士

The averaged samples and their four-feature substrings are depicted below in Table 1.

In Table 1, each averaged sample is depicted (e.g., 古) with its feature codes (e.g., 01140) and its four-feature substrings (e.g., 0114, 1140). In addition, each four-feature substring is displayed with its corresponding representation (e.g., 古 and 古).

TABLE 1

| Averaged Samples | Featured Codes |
| --- | --- |
| 古 | 01140 |
| 古 | 0114 |
| 古 | 1140 |
| 圧 | 01010 |
| 圧 | 0101 |
| 圧 | 1010 |
| 肚 | 010140 |
| 圧 | 0101 |
| 古 | 1014 |
| 古 | 0140 |
| 肚 | 140010 |
| 口 | 1400 |
| 早 | 4001 |
| 土 | 0010 |
| 早 | 140001 |
| 昌 | 1400 |
| 昌 | 4000 |
| 早 | 0001 |
| 肚 | 1400010 |
| 日 | 1400 |
| 早 | 4000 |
| 早 | 0001 |
| 土 | 0010 |
| 昌 | 14001400 |
| 昌 | 1400 |
| 昌 | 4001 |
| 昌 | 0014 |
| 昌 | 0140 |
| 昌 | 1400 |
| 明 | 14001400 |
| 日 | 1400 |
| 月 | 4001 |
| 月 | 0014 |
| 月 | 0140 |
| 日 | 1400 |

Next, the analyzer numerically sorts all of the four-feature code substrings (step 614). After sorting the four-feature code substrings, the analyzer then applies a clustering algorithm to all of the four-feature code substrings (step 616). The clustering algorithm groups together four-feature code substrings that are visually similar. Thus, in this step, the analyzer is determining if any of the visual features (four-feature code substrings) are common among two or more averaged samples and should therefore be considered to be radicals. The clustering algorithm utilized by the preferred embodiment is Wards clustering algorithm as described in Jain and Dubes, *Algorithms for Clustering Data*, pages 55–142 (1988). However, one skilled in the art will appreciate that any clustering algorithm can be used, such as additional clustering algorithms described in Jain and Dubes or the clustering algorithms described in Fukunaga, *Introduction to Statistical Pattern Recognition*, 2nd Edition, Pages 508–563 (1990). An example of the output of the clustering algorithm is depicted below in Table 2.

TABLE 2

| # of Instances | Feature Substring | Corresponding Ink Subsets | |
| --- | --- | --- | --- |
| 7 | 1400 | 口 | Too different - doesn't cluster |
| | | 日 日 | These 2 cluster together |
| | | 日 日 日 日 | These 4 cluster together |
| 3 | 0140 | 古 月 古 | Too different - no cluster |
| 3 | 4001 | 早 月 早 | Too different - no cluster |
| 2 | 0001 | 早 早 | Too different - no cluster |
| 2 | 0010 | 土 土 | Too different - no cluster |
| 2 | 0014 | 月 月 | Too different - no cluster |
| 2 | 0101 | 圧 土 | Too different - no cluster |
| 2 | 4000 | 昌 早 | Too different - no cluster |
| 1 | 0114 | 古 | Only 1 instance - cannot cluster |
| 1 | 1010 | 圧 | Only 1 instance - cannot cluster |
| 1 | 1014 | 古 | Only 1 instance - cannot cluster |
| 1 | 1140 | 古 | Only 1 instance - cannot cluster |

As can be seen from the above table, with reference to the feature code substring 1400, there may be more than one cluster for one feature code substring. After applying the clustering algorithm, the analyzer averages all strokes for each member of each cluster to create an averaged cluster (step 618). The strokes are averaged together using the X and Y coordinates of their end points and one or more intermediate points. An example of the averaging of the strokes is depicted below in Table 3.

TABLE 3

| Four Members of a Cluster | Averaged Cluster |
| --- | --- |
| 日 日 日 日 | 日 |

After averaging the strokes, the analyzer enters each averaged cluster as a radical ("radical prototype") into the radical database (step 620 in FIG. 6B). In making an entry into the radical database, the analyzer assigns a radical number and stores the number of strokes, the visual appearance of the feature code string, as well as the measurements (i.e., X and Y coordinates) for each stroke of the radical prototype. For example, the radical database as it currently stands in the processing of the analyzer is depicted below in Table 4. In this table, the first six radicals correspond to the feature codes of FIG. 7C. In this way, any Kanji character can be defined as comprising one or more of these six radicals. The entries R41 and R42 correspond to the clusters of the 1400 four-feature code substrings found in step 616.

TABLE 4

| Strokes | Radical # | Appearance | Features | Measurements |
| --- | --- | --- | --- | --- |
| 1 | R0 | — | 0 | x1 y1 x2 y2 |
| 1 | R1 | ∣ | 1 | ... |
| 1 | R2 | ╱ | 2 | ... |

TABLE 4-continued

| Strokes | Radical # | Appearance | Features | Measurements |
|---|---|---|---|---|
| 1 | R3 | \ | 3 | ... |
| 1 | R4 | ʼ | 4 | ... |
| 1 | R5 | ⁄ | 5 | ... |
| 4 | R41 | 日 | 1400 | x1 y1 ... x8 y8 |
| 4 | R42 | 月 | 1400 | ... |

Now that the four-feature substrings have been analyzed, the analyzer analyzes the three-feature substrings and then the two-feature substrings. This is performed so as to find all larger radicals first and then narrow the scope to find smaller radicals. The preferred embodiment analyzes only the four, three and two-feature substrings to increase performance during the recognition process. That is, if longer feature substrings (e.g., 5 or 6) were analyzed, the recognition process would be slowed because the recognizer would have to consider many more possible groupings of input strokes during a recognition.

After storing radicals into the radical database, the analyzer performs an analysis on all three-feature substrings (step 624). In this step, steps 612 through 620 are performed on all three-feature substrings that have not already been used. A feature substring has been "used" when the feature substring has been entered as a radical prototype into the radical database. For example, since feature substring 1400 has been used, the averaged sample 日月 is not considered in this step since its feature code is 14001400. That is, after removing the 1400 feature code from consideration, there are no feature codes left over to consider for this averaged sample (i.e., ~~14001400~~). The three-feature substrings that are analyzed in this step are depicted below in Table 5.

TABLE 5

| | | | | | |
|---|---|---|---|---|---|
| 古 | 01140 | 圡 | 01040 | 甲 | ~~140001~~ |
| 𠂉 | 011 | 士 | 010 | 月土 | ~~1400010~~ |
| 仆 | 114 | 𠂉 | 101 | 土 | 010 |
| 口 | 140 | 冂 | 014 | 息 | ~~14001400~~ |
| 匡 | 01010 | 口 | 140 | 明 | ~~14001400~~ |
| 厂 | 010 | 叶 | ~~140010~~ | 士 | 010 |
| 忄 | 101 | | | | |
| 土 | 010 | | | | |

An example of the clusters that may result from the analysis of the three-feature substrings is depicted below in Table 6.

TABLE 6

| # of Instances | Feature Substring | | Corresponding Ink Subsets |
|---|---|---|---|
| 5 | 010 | 厂 | Too different - doesn't cluster |
| | | 土 土 | These 2 cluster together |
| | | 士 士 | These 2 cluster together |
| 2 | 140 | 口 口 | These 2 cluster together |
| 2 | 101 | 忄 | Too different - no cluster |
| | | 𠂉 | |
| 1 | 001 | 𠂉 | Only 1 instance - cannot cluster |
| 1 | 011 | 𠂉 | Only 1 instance - cannot cluster |
| 1 | 014 | 冂 | Only 1 instance - cannot cluster |
| 1 | 114 | 仆 | Only 1 instance - cannot cluster |

After analyzing the three-feature code substrings, the analyzer analyzes the two-feature code substrings (step 626). In this step, the analyzer performs steps 612–620 on all two-feature substrings that have not already been used. At this point in the processing of the analyzer, the radical database is complete. An example of the complete radical database is depicted in Table 7.

TABLE 7

| Strokes | Radical # | Appearance | Features | Measurements |
|---|---|---|---|---|
| 1 | R0 | — | 0 | x1 y1 x2 y2 |
| 1 | R1 | ∣ | 1 | ... |
| 1 | R2 | ⁄ | 2 | ... |
| 1 | R3 | \ | 3 | ... |
| 1 | R4 | ʼ | 4 | ... |
| 1 | R5 | ⁄ | 5 | ... |
| ... | ... | | | |
| 2 | R20 | 十 | 01 | x1 y1 ... x4 y4 |
| 2 | R21 | 厂 | 01 | ... |
| 2 | R22 | 力 | 41 | ... |
| 2 | R23 | 刀 | 41 | ... |
| ... | ... | | | |
| 3 | R30 | 口 | 140 | x1 y1 ... x6 y6 |
| 3 | R31 | 土 | 010 | ... |
| 3 | R32 | 士 | 010 | ... |
| ... | ... | | | |
| 4 | R40 | 五 | 0140 | x1 y1 ... x8 y8 |
| 4 | R41 | 日 | 1400 | ... |
| 4 | R42 | 月 | 1400 | ... |

After analyzing the two-feature substrings, the analyzer creates the Kanji dictionary (step 628). In this step, all of the Kanji characters to be recognized by the system are mapped onto the radical codes for the feature substrings that contributed to the Kanji character. That is, the Kanji characters that are to be recognized by the system are already stored in the system. These Kanji characters are used, for example, to prompt the user when inputting handwritten samples as described relative to step 602 of FIG. 6A. When sorting the samples and creating averaged samples, each sample is still associated with the character for which the user entered the sample. Thus, when an analysis of the feature code substrings of an averaged sample renders a radical, the system has an indication of which characters were associated with the averaged samples from which the radicals were derived. Therefore, in this step, the system is able to identify the radicals that were derived from a particular Kanji character and maps the radicals onto the appropriate Kanji characters. For example, the "open" Kanji Character contributed feature substrings to radicals R41 and R42 and therefore is associated with these radicals. When creating the Kanji character dictionary, for each character, the analyzer associates a Kanji character number and stores the number of strokes, the meaning of the character, the appearance of the character and the component radicals of the character in the appropriate order. An example Kanji character dictionary is depicted below in Table 8. As can be seen in this table, some of the radicals comprise nontraditional radicals. For example, Kanji character K301 comprises radicals R42, R0 and R20, whereas in conventional systems, this Kanji character would typically comprise traditional radical 74 (see FIG. 2A) and traditional radical 51 (again, see FIG. 2A).

TABLE 8

| Strokes | Kanji # | Meaning | Appearance | Radical Spelling |
|---|---|---|---|---|
| ... | ... | | | |
| 2 | K20 | two | ニ | R0 R0 |
| ... | ... | | | |
| 4 | K40 | five | 五 | R40 |
| 4 | K41 | day | 日 | R41 |
| 4 | K42 | month | 月 | R42 |
| ... | ... | | | |
| 5 | K80 | old | 古 | R20 R30 |

TABLE 8-continued

| Strokes | Kanji # | Meaning | Appearance | Radical Spelling |
|---|---|---|---|---|
| 5 | K81 | press |  | R21 R31 |
| 5 | K81 | call for |  | R23 R30 |
| 5 | K83 | increase |  | R22 R30 |
| ... | ... | | | |
| 6 | K200 | good luck |  | R32 R30 |
| 6 | K201 | vomit |  | R30 R31 |
| 6 | K202 | quick |  | R41 R20 |
| ... | ... | | | |
| 7 | K300 | stomach |  | R42 R31 |
| 7 | K301 | liver |  | R42 R0 R20 |
| ... | ... | | | |
| 8 | K400 | bright |  | R41 R41 |
| 8 | K401 | open |  | R41 R42 |
| ... | ... | | | |
| 15 | K900 | language |  | R3 R0 R0 R0 R30 R40 R30 |
| ... | ... | | | |

Figure 8:
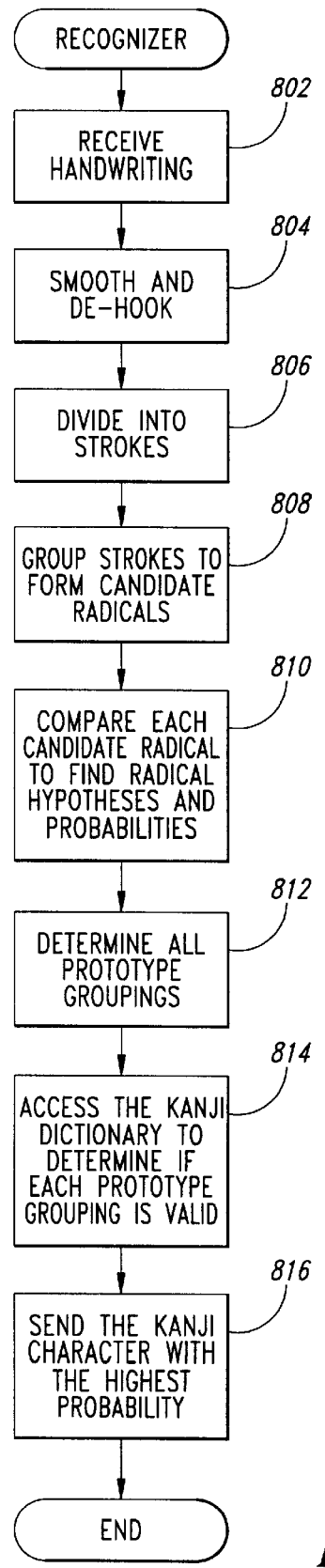
FIG. 8 depicts a flowchart of the steps performed by the recognizer of the preferred embodiment of the present invention.

FIG. 8 depicts a flowchart of the steps performed by the recognizer of the preferred embodiment of the present invention. The recognizer is utilized during the recognition process. The recognizer is responsible for receiving handwritten input from a user, recognizing the handwriting and converting the handwriting to a Kanji character as referenced by a character code. After the recognizer performs its processing, the recognizer sends the Kanji character code to the control program and the control program then sends it to the application program where the application program uses the Kanji character code to display the Kanji character to the user. Although the preferred embodiment is described as recognizing only one Kanji character at a time, one skilled in the art will appreciate that the present invention can be used to recognize more than one Kanji character at a time.

Figure 9A:
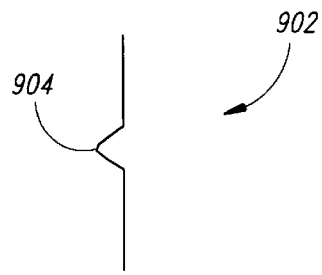
FIG. 9A depicts a deviation in a stroke that is smoothed during the process of smoothing.
Figure 9B:
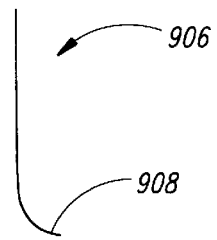
FIG. 9B depicts a trailing hook in a stroke that is deleted during the process of dehooking.

The first step performed by the recognizer is to receive handwriting input from a user (step 802). In this step, the user of the system writes a Kanji character on the tablet using the pen and the recognizer receives this handwriting. The recognizer then smoothes and dehooks the handwriting (step 804). "Smoothing" refers to the deletion of any inadvertent deviations from a straight line (e.g., a bump) that the user may have entered in a stroke. Such a deviation 904 in a stroke 902 is depicted in FIG. 9A. "Dehooking" refers to deleting off of a stroke an inadvertent trailing hook that users sometimes enter. An example of a trailing hook 908 on a stroke 906 is depicted in FIG. 9B. Both smoothing and dehooking are more clearly described in U.S. patent application Ser. No. 08/452,660, entitled "Handwritten Symbol Recognizer," which has previously been incorporated by reference.

After smoothing and dehooking the Kanji character, the recognizer divides the Kanji character into its component strokes (step 806). When dividing the Kanji character into strokes, the strokes are listed according to the time in which they were drawn. For example the Kanji character  may be divided into the following six strokes . After dividing the Kanji character into its component strokes, the recognizer groups the strokes to form candidate radicals (step 808). In this step, the recognizer groups the strokes into groups of one, two, three and four strokes to form candidates for testing against the radical database. For example, the six strokes can be grouped into six groups of one stroke each , three groups of two strokes each , or two groups of three strokes each . In addition, one skilled in the art will appreciate that other groupings can be made, such as one group of four strokes with one group of two strokes. After dividing the strokes into groups, the groups are compared against the radical database in the order of largest to smallest, with the groups containing individual strokes only being considered if the larger groups do not match a radical in the radical database. In this example, the groups of two strokes do not match any radicals. With respect to the two groups of three strokes, the first group matches the  radical and the second group matches the  radical.

After grouping the strokes to form candidate radicals, each candidate radical is compared to the radical database to retrieve radical hypotheses and probabilities (step 810). In this step, each candidate radical is compared to the radicals in the radical database using a shape classifier. The shape classifier matches the shape of the candidate to the shape of the radicals in the radical database. If the shapes compare to within a predefined percentage of confidence, a match is considered to have been made. If a match is made, the shape classifier returns a hypothesis and a probability. A "hypothesis" is a potential match (i.e., a radical) and a "probability" is the probability that the radical corresponds to the candidate. This probability can be viewed as a percentage of confidence. In this step, the preferred embodiment utilizes as its shape classifier the geometric comparator as described in U.S. patent application Ser. No. 08/452,660, entitled "Handwritten Symbol Recognizer," which has previously been incorporated by reference. Although the preferred embodiment is described as utilizing the geometric comparator as the shape classifier, one skilled in the art will recognize that other shape classifiers or pattern recognition techniques can be used.

When comparing the two groups to the radical database of Table 6, the first group  matches only the "mouth" radical , which is R30. The second group  matches both the "earth" radical ± R31 and the "Samurai" radical ± R32. An example of the probabilities may include 0.9 for the "mouth" radical R30, 0.6 for the "earth" radical R31, and 0.4 for the "Samurai" radical R32. After receiving the radical hypotheses and probabilities, the recognizer determines all radical prototype groupings (step 812). In this step, the recognizer groups all of the hypotheses together for all possible combinations. The recognizer then accesses the Kanji dictionary to determine if each radical prototype grouping is valid (step 814). For example, the only grouping in the example dictionary in Table 7 is the grouping of the "mouth" radical R30 with the "earth" radical R31. That is, the grouping of the "mouth" radical R30 and the "Samurai" radical R32 is not found and thus discarded. After determining all valid prototype groupings, the recognizer sends a character code of the Kanji character with the highest probability to the control program (step 816). In this step, the recognizer multiplies the probabilities of each radical hypothesis together to form a product for each radical prototype grouping (if there is more than one) and ranks the radical hypotheses according to their products. For example, the product for the "mouth" radical R30 (0.9) and the "earth" radical R31 (0.6) is 0.54.

As previously described, the techniques described herein can be used for recognizing Kanji and other languages. However, more generally, the techniques described herein can be used for symbol recognition, regardless of any particular natural language. For example, the techniques described herein can be used to recognize chemical compound formulae by using radical-like combinations of letters and graphic markings representing such things as bonds and valence. In addition, the techniques described herein can be used to recognize mathematical expressions by using radical-like combinations of digits, arithmetic operators, integrals, summation signs and other mathematical symbols. A further example is recognizing electrical engineering diagrams of semiconductor elements, such as NAND gates, by using radical-like combinations of graphic markings, such as the markings indicating transistors and resistors. A still further example is recognizing musical chords by using radical-like combinations of notes, flats, sharps and other musical symbols. Although some specific examples have been identified, one skilled in the art will appreciate that the techniques described herein can be used for additional symbol recognition systems.

While the present invention has been described with reference to a preferred embodiment thereof, those skilled in the art will know of various changes in form that may be made without departing from the spirit and scope of the claimed invention as defined in the appended claims.

I claim:

1. A method in a computer system for identifying radicals for a plurality of Kanji characters, each of the plurality of Kanji characters comprising at least one radical, the method comprising:
   receiving handwriting samples for each of the plurality of Kanji characters, each handwriting sample comprising at least one stroke;
   grouping the handwriting samples for each of the plurality of Kanji characters by the number of strokes within each handwriting sample;
   categorizing each stroke of each handwriting sample based on the shape of the stroke;
   averaging the handwriting samples within each group that have the same categorization of strokes;
   determining characteristics common to two or more of the averaged samples;
   identifying the characteristics common to two or more of the averaged samples as radicals;
   storing the identified radicals into the computer system; and
   mapping each of the plurality of Kanji characters onto the at least one radical that comprises the Kanji character.

2. A method in a computer system for identifying common sequences of components within a plurality of symbols, each symbol having a meaning and a number of components, each component having a feature and a visual representation, the method comprising:
   receiving the plurality of symbols;
   for each meaning,
      creating a grouping of the symbols based on the number of components within each symbol; and
   for each grouping,
      creating a sub-grouping of symbols that have components with similar features;
   identifying sequences of components that have the same features and that are common to at least two sub-groupings; and
   for each of the identified sequences of components,
      clustering the sequences of components into clusters that are visually similar; and
      for each cluster, averaging the visual representation of the sequences of components, wherein each averaged visual representation of the sequences of components is an identified common sequence of components within the plurality of symbols.

3. The method of claim 2 wherein the step of creating a grouping includes the step of averaging the symbols within each grouping.

4. The method of claim 2 wherein the symbols are Kanji characters and the components are strokes.

5. The method of claim 2 wherein the symbols are words and the components are strokes.

6. The method of claim 2 wherein the step of identifying sequences of components includes the step of identifying sequences of four components.

7. The method of claim 2 wherein the step of identifying sequences of components includes the step of identifying sequences of three components.

8. The method of claim 2 wherein the step of identifying sequences of components includes the step of identifying sequences of two components.

9. A method in a computer system for identifying common sub-parts within a plurality of symbols, each symbol having a meaning and a number of sub-parts, each sub-part having one or more components, each component having a visual representation, the method comprising:
   receiving the plurality of symbols;
   identifying sequences of components within the plurality of symbols that have a visually similar representation and that are common to at least two symbols by comparing a sequence of components in one symbol to a sequence of components in another symbol by:
      sorting the received symbols based on the meaning of the received symbols and the number of components within the received symbols;
      averaging the symbols having the same meaning and the same number of components to create averaged symbols; and
      identifying sequences of components within the averaged symbols that have a visually similar representation and that are common to at least two of the averaged symbols; and
   for each identified sequence of components, creating a sub-part based on the visual representation of the components within the sequences of components.

10. The method of claim 9 further including:
    storing the created subparts into the computer system;
    receiving handwriting input from a user of the computer system; and
    comparing the handwriting input to the stored subparts to recognize the handwriting input.

11. The method of claim 9 wherein the symbols are Kanji characters, wherein the subparts are radicals and wherein the components are strokes.

12. The method of claim 9 wherein the symbols are words and wherein the components are strokes.

13. The method of claim 9 wherein the symbols are chemical compound formulae and the components are strokes.

14. The method of claim 9 wherein the symbols are mathematical expressions and the components are strokes.

15. The method of claim 9 wherein the symbols are representations of integrated circuit elements and the components are strokes.

16. The method of claim 9 wherein the symbols are musical chords and the components are strokes.

17. A computer-readable medium containing computer instructions for directing a computer to perform a method for identifying common sub-parts within a plurality of symbols, each symbol having a meaning and a number of sub-parts, each sub-part having one or more components, each component having a visual representation, the method comprising:

receiving the plurality of symbols;

identifying sequences of components within the plurality of symbols that have a visually similar representation and that are common to at least two symbols by comparing a sequence of components in one symbol to a sequence of components in another symbol by:

sorting the received symbols based on the meaning of the received symbols and the number of components within the received symbols;

averaging the symbols having the same meaning and the same number of components to create averaged symbols; and identifying the sequences of components within the averaged symbols that have a visually similar representation and that are common to at least two of the averaged symbols; and for each identified sequence of components, creating a sub-part based on the visual representation of the components within the sequences of components.

18. The computer-readable medium of claim 17 further including:

storing the created subparts into the computer system;

receiving handwriting input from a user of the computer system; and comparing the handwriting input to the stored subparts to recognize the handwriting input.

19. The computer-readable medium of claim 17 wherein the symbols are Kanji characters, wherein the subparts are radicals and wherein the components are strokes.

20. The computer-readable medium of claim 17 wherein the symbols are words and wherein the components are strokes.

21. The computer-readable medium of claim 17 wherein the symbols are chemical compound formulae and the components are strokes.

22. The computer-readable medium of claim 17 wherein the symbols are mathematical expressions and the components are strokes.

23. The computer-readable medium of claim 17 wherein the symbols are representations of integrated circuit elements and the components are strokes.

24. The computer-readable medium of claim 17 wherein the symbols are musical chords and the components are strokes.

* * * * *